US006931195B2

(12) United States Patent
Lemoff

(10) Patent No.: US 6,931,195 B2
(45) Date of Patent: Aug. 16, 2005

(54) PARALLEL FIBER-FAN-OUT OPTICAL INTERCONNECT FOR FIBER OPTIC SYSTEM

(75) Inventor: Brian E. Lemoff, Union City, CA (US)

(73) Assignee: Agilent Technologies, Inc., Pao Alto, CA (US)

(*) Notice: Subject to any disclaimer, the term of this patent is extended or adjusted under 35 U.S.C. 154(b) by 0 days.

(21) Appl. No.: 10/635,719

(22) Filed: Aug. 5, 2003

(65) Prior Publication Data

US 2005/0031289 A1 Feb. 10, 2005

(51) Int. Cl.[7] .............................. G02B 6/00; G02B 6/44
(52) U.S. Cl. ..................................... 385/137; 385/114
(58) Field of Search ................................ 385/137, 136, 385/139, 114, 54, 55

(56) References Cited

U.S. PATENT DOCUMENTS 6,116,788 A * 9/2000 Melchior et al. ............. 385/59
6,415,092 B1 * 7/2002 Crespel et al. ............... 385/135
6,464,404 B1 * 10/2002 Robinson et al. ............. 385/54
6,560,395 B1 * 5/2003 Shahid ........................ 385/137
6,655,848 B2 * 12/2003 Simmons et al. ............. 385/56
6,721,042 B1 * 4/2004 Sun et al. .................... 355/114
6,751,393 B2 * 6/2004 Sugama et al. ............... 385/134
2003/0223707 A1 * 12/2003 Nakanishi et al. ............ 385/92

* cited by examiner

Primary Examiner—Chandrika Prasad

(57) ABSTRACT

A fiber ribbon includes a plurality of first segments of optical fibers that extend in a planar side-by-side arrangement having a first predetermined pitch. A fiber-fan-out including a plurality of second segments of the optical fibers extends in a diverging arrangement from the fiber ribbon. A fiber holder extends across the plurality of second segments of the optical fibers for maintaining a plurality of terminal portions of the second segments in a second predetermined pitch that is greater than the first predetermined pitch so that the terminal portions can each be optically coupled to a corresponding optical subassembly (OSA) of a plurality of OSAs arranged in a linear array. An alternate embodiment uses a second fiber holder in place of the fiber ribbon. The holders can be replaced with a common housing assembly spanning all but the terminal portions of the optical fibers.

4 Claims, 6 Drawing Sheets

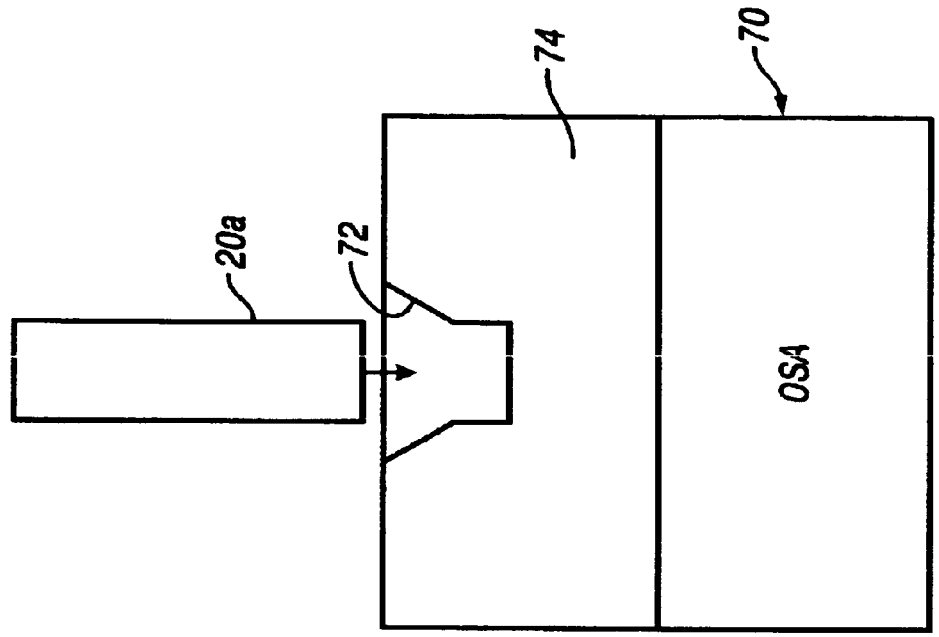
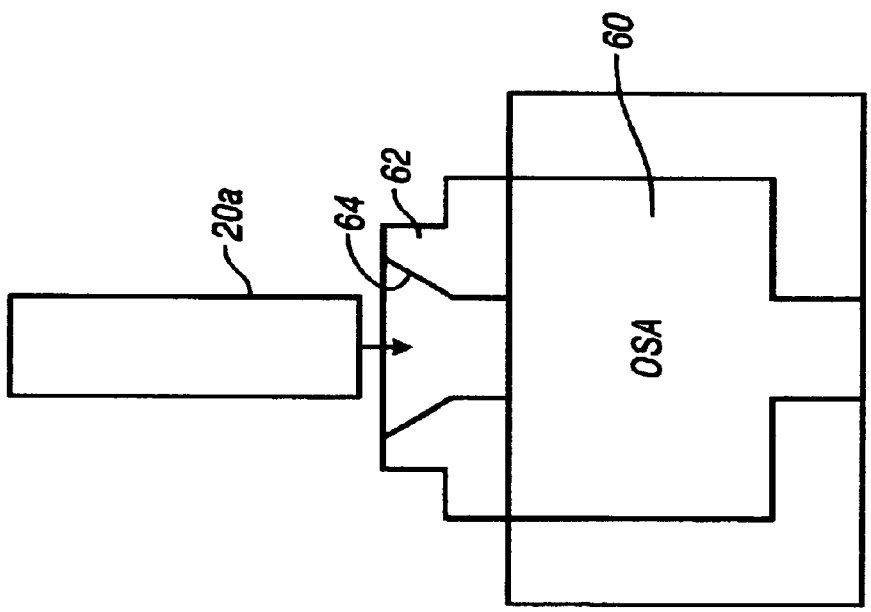

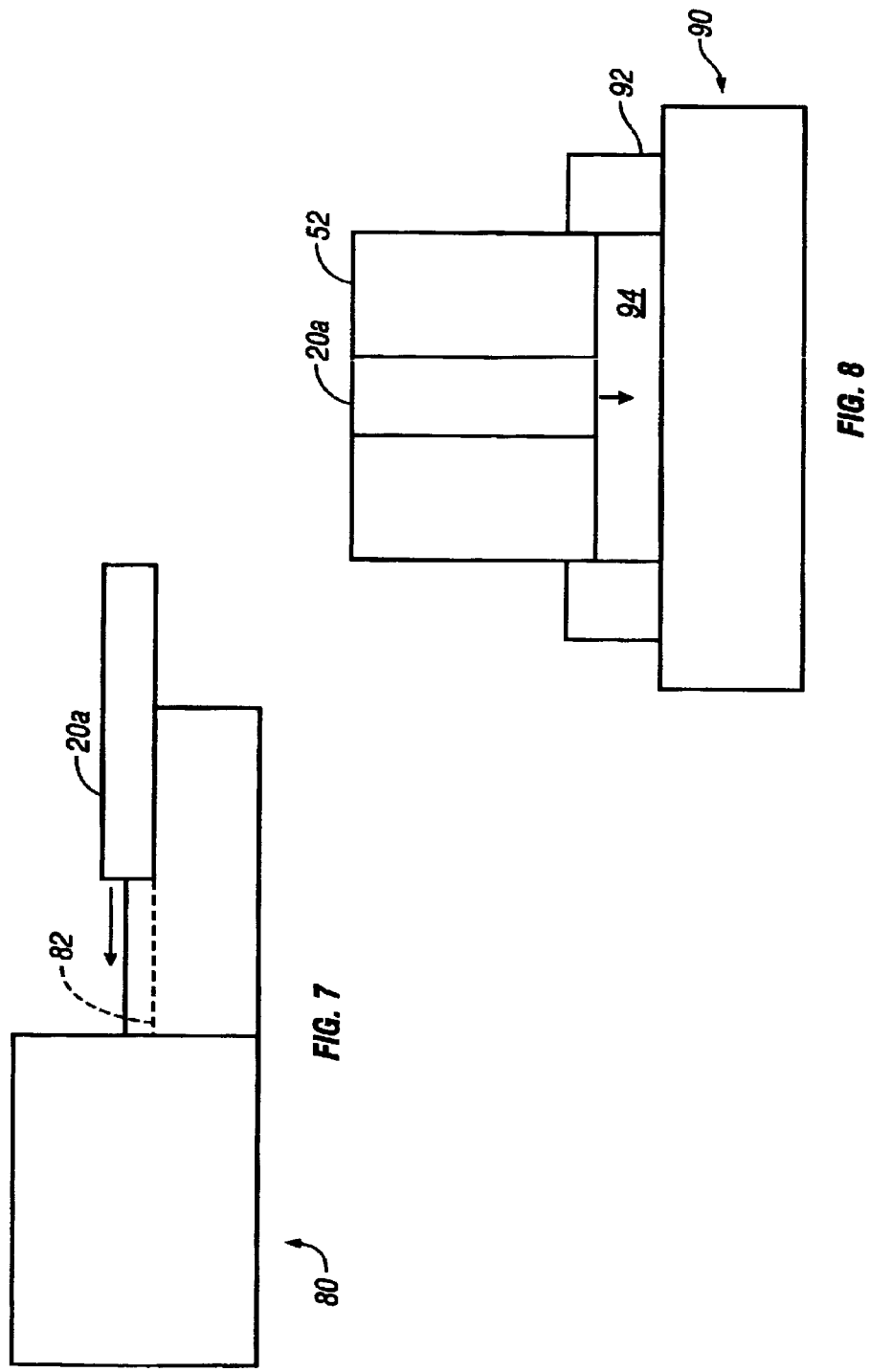

PARALLEL FIBER-FAN-OUT OPTICAL INTERCONNECT FOR FIBER OPTIC SYSTEM

BACKGROUND OF THE INVENTION

Fiber optic systems are used to reliably send large amounts of data over both short and long haul routes and often employ parallel communications modules comprising a 1×N array of optoelectronic devices (OEs), either photoemitters, such LEDs or laser diodes, or photodetectors such as PIN photodiodes, integrated detector/preamplifiers (IDPs), or avalanche photo-diodes (APDs).

There are two conventional types of parallel optical module. The most common type employs a single optical subassembly (OSA) that incorporates multiple OEs (photoemitters or photodetectors) that are matched in number to the number of fibers in the connector. This approach has the disadvantage that if a single channel in the OSA is found to be defective during assembly or testing, the entire OSA must be discarded, reducing yield. This approach has the further disadvantage that similar products that use different numbers of channels, including single channel products, must each use a different OSA.

A second type of conventional parallel optical module is built out of a plurality of single channel OSAs, each of which has its own fiber pigtail or connector. The individual fibers are individually routed within the module to a parallel optical connector assembly where they are terminated in a manner than allows for ready connection to an external fiber optic ribbon. This approach has the disadvantage that the individual handling of the fibers is time consuming and expensive and sometimes requires that the optical fibers have additional length that undesirably increases the length and width of this second type of parallel optical module.

SUMMARY OF THE INVENTION

In accordance with the present invention a parallel optical interconnect for use in a fiber optic system includes a plurality of first segments of optical fibers extending in a side-by-side arrangement. A plurality of first terminal portions of the first segments are structurally maintained in a first predetermined pitch so that the first terminal portions can each be optically coupled to a corresponding routed optical fiber via a parallel optical connector having the first predetermined pitch. The optical interconnect further includes a fiber-fan-out in the form of a plurality of second segments of the optical fibers extending in a diverging arrangement from the plurality of first segments. A plurality of second terminal portions of the second segments are structurally maintained in a second predetermined pitch that is greater than the first predetermined pitch so that the second terminal portions can each be optically coupled to a corresponding optical subassembly (OSA) of a plurality of OSAs arranged in an array.

BRIEF DESCRIPTION OF THE DRAWINGS

Throughout the drawing figures like reference numerals refer to like parts.

FIG. 5 is a diagrammatic vertical sectional view of an OSA with a built-up bare fiber receptacle that can receive one of the free ends of the optical fibers of the optical interconnects of FIGS. 1–3.

FIG. 6 is a diagrammatic vertical sectional view of an OSA with an integrated bare-fiber receptacle that can receive one of the free ends of the optical fibers of the optical interconnects of FIGS. 1–3.

FIG. 7 is a diagrammatic side elevation view of an OSA with a V-groove bare fiber receptacle that can receive one of the free ends of the optical fibers of the optical interconnects of FIGS. 1–3.

FIG. 8 is a diagrammatic vertical sectional view of an OSA with a ferrule receptacle that can receive one of the polished mini-ferrules of the optical interconnect of FIG. 4.

DETAILED DESCRIPTION

Figure 1:
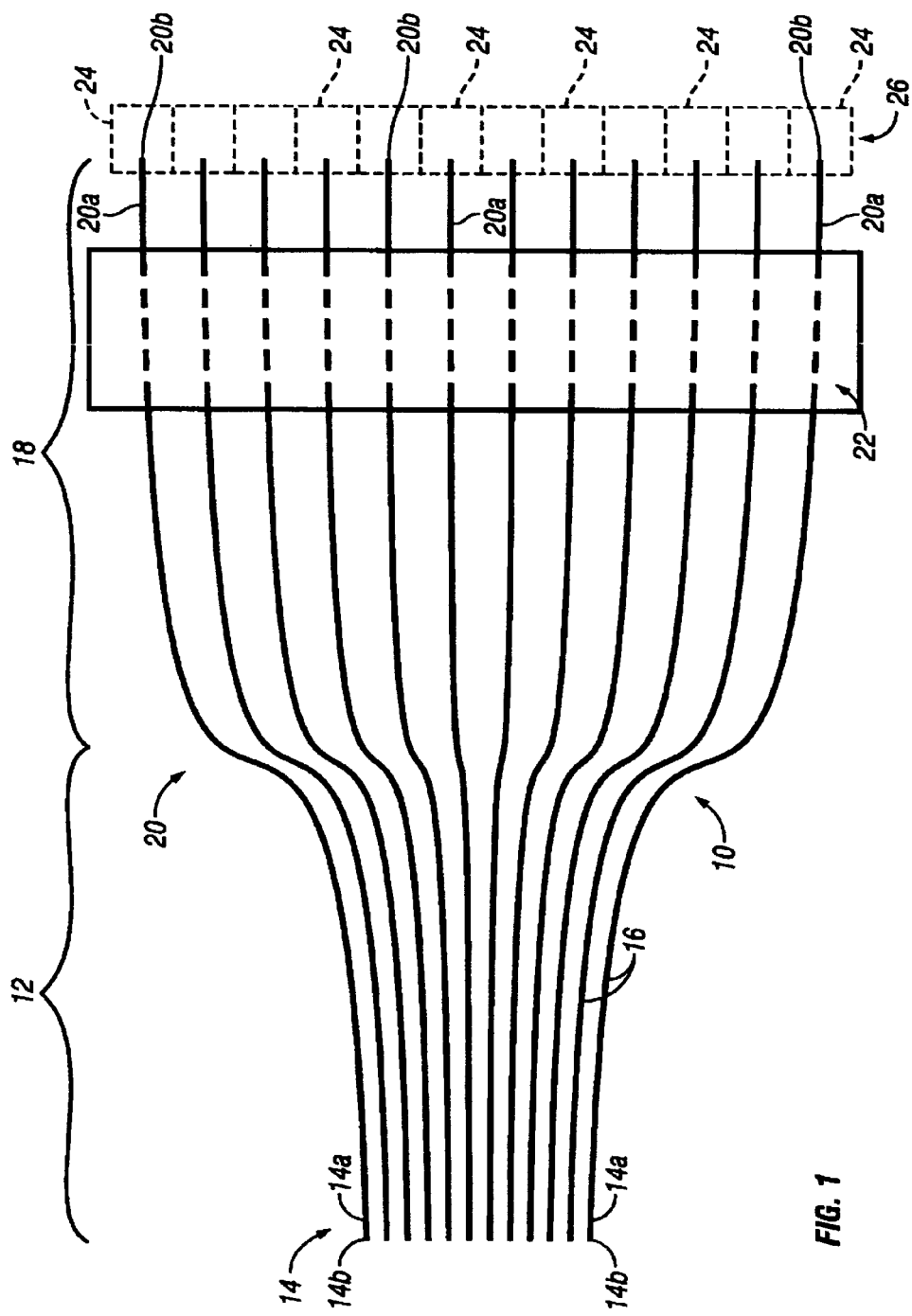
FIG. 1 is a diagrammatic plan view of a parallel fiber-fan-out optical interconnect in accordance with a first embodiment of the present invention.

Referring to FIG. 1, a parallel fiber-fan-out (FFO) optical interconnect 10 in accordance with a first embodiment of the present invention has a fiber ribbon 12 including a plurality of first segments 14 of optical fibers 16 extending longitudinally in a planar side-by-side arrangement having a first predetermined pitch, such as two-hundred and fifty micrometers. The optical fibers 16 could be either plastic optical fiber (POF) or glass optical fiber (GOF). Clearly the center-to-center spacing or pitch is much greater where the optical interconnect is designed for POF than where it is designed for GOF. A fiber-fan-out 18 including a plurality of second segments 20 of the optical fibers 16 extends in a diverging arrangement from the fiber ribbon 12. The first segment 14 and the second segment 20 of each optical fiber 16 are sections or lengths of the same continuous uninterrupted optical fiber. A generally rectangular fiber holder 22 made of molded plastic extends transversely across the plurality of second segments 20 of the optical fibers 16 for maintaining a plurality of terminal portions 20a of the second segments in a second predetermined pitch, such as one and one-half millimeters, that is greater than the first predetermined pitch. This allows each of the terminal portions 20a to be optically coupled to a corresponding optical subassembly (OSA) of a plurality of OSAs 24 arranged in a linear array 26.

In FIG. 1, the intermediate portions of the second segments 20 of the optical fibers 16 that pass through the fiber holder 22 are shown in broken lines to indicate that they are concealed. The OSAs 24 are illustrated diagrammatically in phantom lines in FIG. 1 to indicate that they are not part of the parallel fiber-fan-out optical interconnect 10 which is a device that allows for connection to the array 26 of OSAs 24.

The terminal portions 20a (FIG. 1) of the second segments 20 of the optical fibers 16 are free fiber lengths with cleaved ends 20b that can be inserted into fiber receptacles in the OSAs 24. The terminal portions 14a of the first segments 14 of the optical fibers 16 are also free fiber lengths with cleaved ends 14b that can be inserted into a mating conventional parallel fiber connector (not illustrated). This allows the terminal portions 14a to each be optically coupled to a corresponding optical fiber (not illustrated) that is routed through a building, for example, to or from a remote communications device (not illustrated). The plastic ribbonizing web material between the first segments 14 provides a holder that maintains their terminal portions 14a in the first predetermined pitch. The ribbonizing material terminates at the right end of the fiber ribbon 12. The fiber holder 22 is a separate discrete body member that holds the terminal portions 20a of the second segments 20 in the second predetermined pitch. The fiber holder 22 can be pre-formed with straight parallel channels through which each of the fibers 16 are pushed, or the fiber holder 22 can be made in halves with fiber receiving channels that are placed over the fibers 16 and secured together with adhesive or mechanical fasteners. Alternatively, the fiber holder 22 can be molded over the fibers 16. A simple tool (not illustrated) may support the individual fibers 16 in position to form the fiber-fan-out 18 for insertion through the fiber holder 22 followed by the optional application of an adhesive to hold the fibers 16 in place. The terminal portions 20a of the second segments 20 of the optical fibers 16 extend beyond the fiber holder 22 a sufficient distance to provide the necessary compliance to allow each cleaved end 20b to mate with its corresponding OSA 24.

The size of the parallel fiber-fan-out optical interconnect 10 (FIG. 1) is limited by the number of optical fibers 16, the spacing of the OSAs 24 within the linear array 26 of OSAs, and the minimum possible bend radius of the optical fiber 16. Assuming a bend radius of ten millimeters and an OSA spacing of one millimeter, the minimum length of the optical interconnect 10 would be approximately six and six-tenths millimeters for a four-fiber array and twelve and two-tenths millimeters for a twelve-fiber array. Assuming an OSA spacing of two millimeters and the same ten millimeter bend radius, the minimum length of the optical interconnect 10 would be ten and two-tenths millimeters for a four-fiber array and seventeen and one tenth millimeters for a twelve fiber array.

The array 26 (FIG. 1) forms a parallel optical module that is built up out of individual OSAs 24. In the parallel fiber-fan-out optical interconnect 10 the OSAs 24 are single channel, but they could be multiple-channel, i.e. incorporate multiple optoelectronic devices (OEs) such as lasers or photodetectors. The OSAs 24 can be distributed within the module or array 26 with a spacing that is much larger than the fiber spacing in the optical interconnect 10. The array 26 of OSAs 24 can either be a simple linear array or a more general two-dimensional array, for example, two parallel rows that are shifted with respect to one another by half the center-to-center spacing within a row. Each OSA 24 can be designed with a receptacle as hereafter described for mating with a bare fiber in the form of terminal portion 20a with its cleaved end 20b. Alternatively, each OSA 24 can be designed to mate with a ferrule (not shown in FIG. 1) surrounding each terminal portion 20a.

Figure 2:
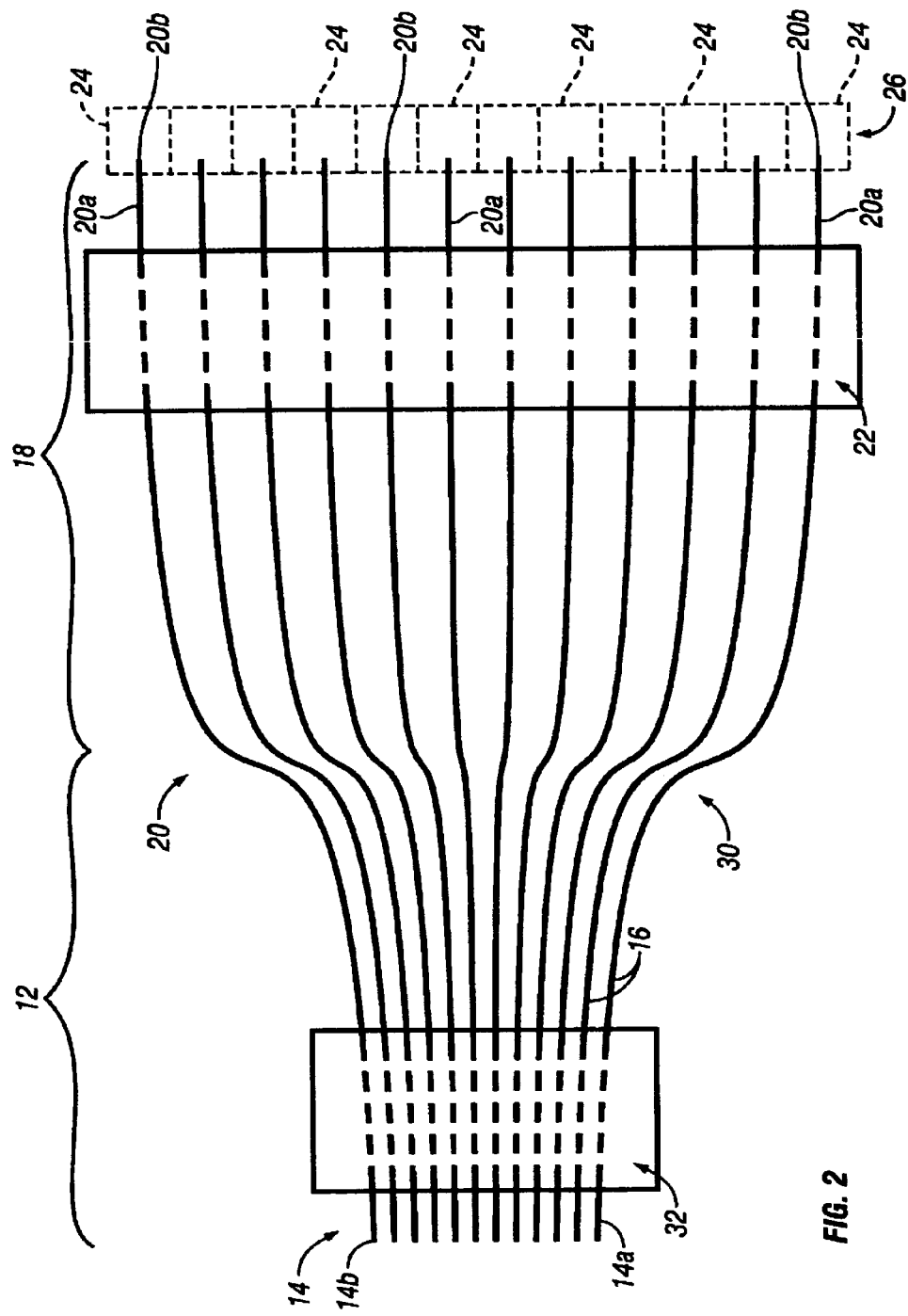
FIG. 2 is a diagrammatic plan view of a parallel fiber-fan-out optical interconnect in accordance with a second embodiment of the present invention.

FIG. 2 illustrates a parallel fiber-fan-out optical interconnect 30 in accordance with a second embodiment of the present invention. The optical interconnect 30 is similar to the optical interconnect 10 except that the former has a second generally rectangular fiber holder 32. The fiber holder 32 is a separate discrete body member that maintains the terminal portions 14a of the first segments 14 of the optical fibers 16 in the first predetermined pitch instead of the ribbonizing or web material of the fiber ribbon 12 which is not part of the optical interconnect 30. In FIG. 2, the intermediate portions of the first segments 14 of the optical fibers 16 that pass through the second fiber holder 32 are shown in broken lines to indicate that they are concealed. The second fiber holder 32 can be formed in any of the fashions described above in connection with the first fiber holder 22, i.e. with the optical fibers 16 either being inserted through pre-formed holes, clamped around, molded over, and optionally adhesively anchored. The second fiber holder 32 holds the terminal portions 14a of the first segments 14 of the optical fibers 16 in the first predetermined pitch that matches that of its mating conventional parallel fiber connector (not illustrated). The terminal portions 14a could also be surrounded with ferrules (not illustrated) so that their cleaved ends 14b can be mated with cleaved ends of the routed optical fibers (not illustrated) in the parallel fiber connector.

Figure 3:
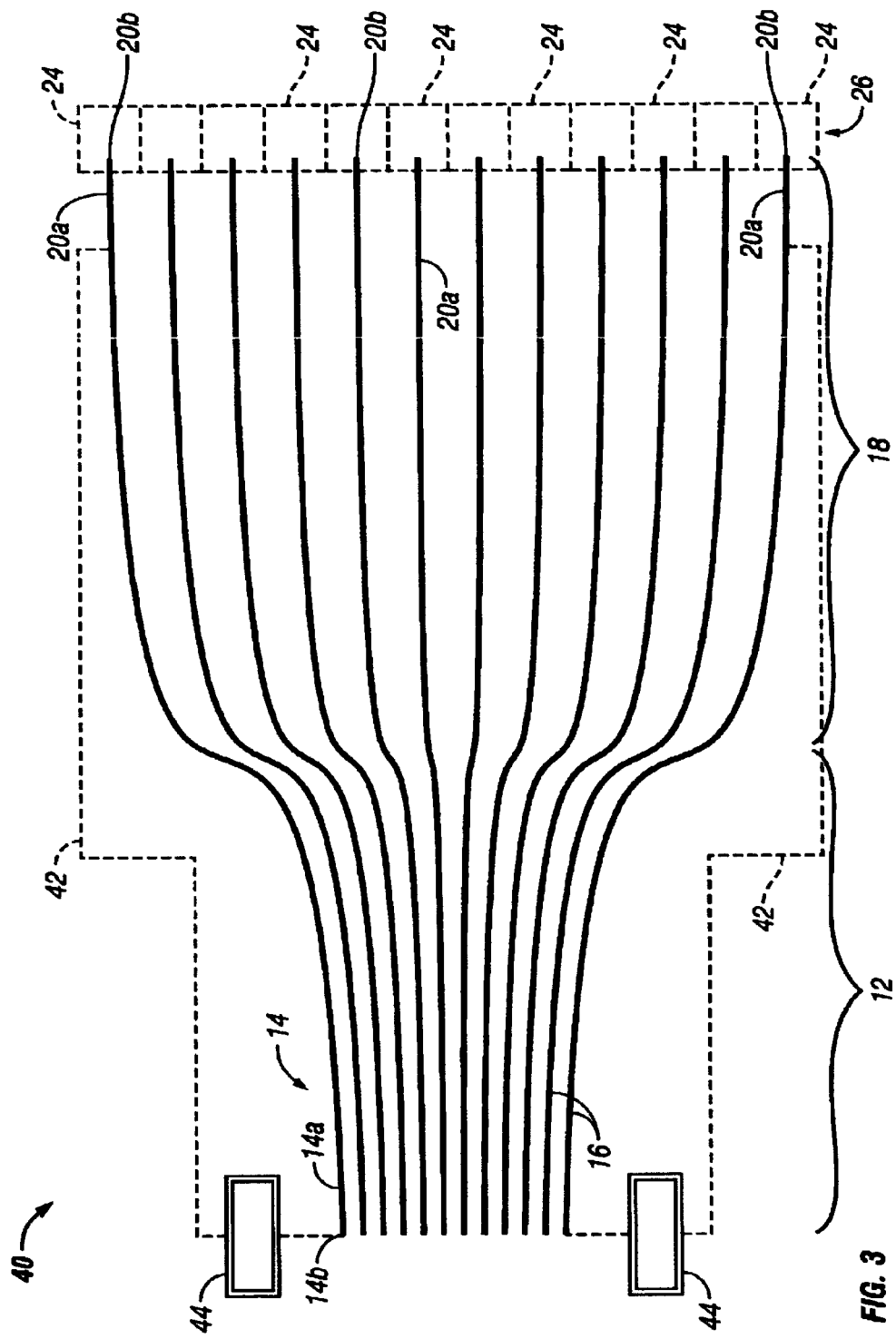
FIG. 3 is a diagrammatic plan view of a parallel fiber-fan-out optical interconnect in accordance with a third embodiment of the present invention.

FIG. 3 illustrates a parallel fiber-fan-out optical interconnect 40 in accordance with a third embodiment of the present invention. A common injection molded plastic housing assembly 42 illustrated in phantom lines surrounds the first segments 14 and the second segments 20 of the optical fibers 16 except for their terminal portions 14a and 20a, respectively. The housing assembly 42 may have flat opposing flat faces with stepped side edges similar to the configuration of multi-pin electrical connectors that are plugged into personal computers. The housing assembly 42 holds the terminal portions 14a in the first predetermined pitch and the terminal portions 20a in the second predetermined pitch. Thus the cleaved ends 14b of the first segments 14 can be mated with the corresponding ends of the routed optical fibers held in the mating conventional parallel fiber connector (not illustrated). It also allows the cleaved ends 20b of the terminal portions 20a of the second segments 20 to be mated with the OSAs 24 of the array 26. The common housing assembly 42 can be formed in any of the fashions described above in connection with the fiber holders 22 and 32, i.e. with the optical fibers 16 either being inserted through pre-formed holes, clamped around, molded over, and optionally adhesively anchored.

A plurality of alignment pins 44 (FIG. 3) extend from the narrower end of the housing assembly 42 for aligning the connector 40 with the parallel fiber connector. Similar pins (not illustrated) could also extend from the wider end of the housing assembly 42 for aligning the connector 40 to the array 26. The pins 44 could of course be threaded pins with slotted heads for screwing and tightening into female threaded holes for secure attachment. The pins are not necessary and instead the housing assembly 42 could be molded with slots, detents, projections, etc. for mating with complementary physical features on the parallel fiber connector and array 26.

The parallel fiber-fan-out optical interconnect 40 of FIG. 3 has several advantages. First, no external fan-out tool is necessary to fabricate the interconnect 40. The optical fibers 16 can be inserted through holes on the connector side of the housing assembly 42 and pushed through the housing assembly 42. As the optical fibers 16 are pushed through the housing assembly 42, they fan out according to the shape of the curved channels or tunnels that are molded into the plastic, finally emerging on the OSA array 26 side of the interconnect 40 already matching the spacing of its individual OSAs 24. Where the optical fibers 16 are pushed through or laid in performed curved channels or tunnels in the housing assembly 42 the channels are most easily formed by injection molding the housing assembly 42 in two separate halves which are then joined around the optical fibers 16. Another advantage of this approach is that the cleaved ends 14b can be polished and used to mate directly to an external fiber connector, eliminating the need to utilize separate parallel connector ferrules.

Figure 4:
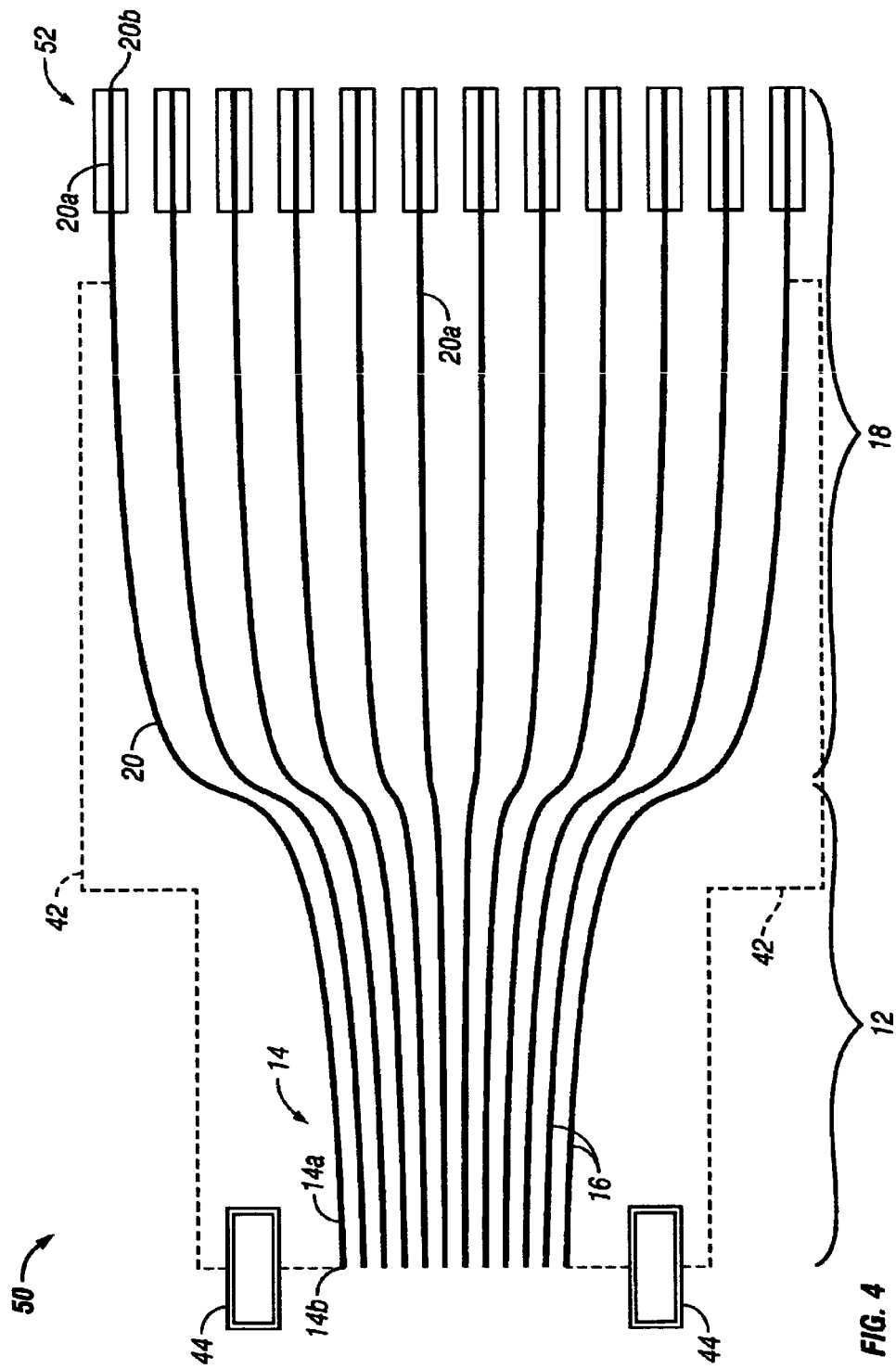
FIG. 4 is a diagrammatic plan view of a parallel fiber-fan-out optical interconnect in accordance with a fourth embodiment of the present invention.

FIG. 4 illustrates a parallel fiber-fan-out optical interconnect 50 in accordance with a fourth embodiment of the present invention. It is similar to the interconnect 40 except that the former includes ferrules 52 mounted around the terminal portions 20a of each of the second segments 20 of the optical fibers 16. The ferrules 52 and the cleaved ends 20b can be polished as a batch, and then used to mate with OSAs 24 that are fashioned with ferrule receiving receptacles as hereafter described. The injection molded housing assembly 42 can contain holes into which separate ferrules 52 are subsequently inserted, or the ferrules 52 could be insert molded into the housing assembly 42. The ferrules 52 could also be molded in plastic as integral extensions of the housing assembly 42.

It can be appreciated in connection with FIGS. 3 and 4 that I have also invented a novel method of forming a parallel interconnect for use in a fiber optic system. My method includes the initial step of providing a plurality of optical fibers 16. The next step of my method involves forming a housing assembly 42 with a plurality of diverging channels, tunnels, passages or holes that extend through the housing assembly 42 from a first (left in FIGS. 3 and 4) end of the housing assembly 42 to a second (right in FIGS. 3 and 4) end of the housing assembly 42. Each channel is dimensioned to slidably receive a corresponding one of the optical fibers 16. The final step of my method involves threading the optical fibers 16 through corresponding channels so that a first set of terminal portions 14a are free at the first end of the housing assembly 42 and a second set of terminal portions 20a are free at the second end of the housing assembly 42. The channels are configured to maintain the first terminal portions 14a in the first predetermined pitch so that the first terminal portions can each be optically coupled to a corresponding routed optical fiber via a parallel optical connector having the first predetermined pitch. The channels are also configured to provide the pattern of the fiber-fan-out 18 that maintains the second terminal portions 20a in the second predetermined pitch that is greater than the first predetermined pitch so that the second terminal portions can each be optically coupled to the corresponding optical subassembly (OSA) 24 of a plurality of OSAs arranged in an array 26.

FIG. 5 illustrates an OSA 60 with a built-up structure 62 formed with a partially tapered bare fiber receptacle 64 that can receive one of the terminal portions 20a of the optical fibers 16 of the optical interconnects of FIGS. 1–3. The structure 62 is a stand-alone part that is aligned and attached to the OSA 60.

FIG. 6 illustrates an OSA 70 with an integrated partially tapered bare-fiber receptacle 72 that can receive one of the terminal portions 20a of the optical fibers 16 of the optical interconnects of FIGS. 1–3. The receptacle 72 is integral to the OSA 70. For example, where the OSA 70 includes a lid 74 with a lens on the interior surface, the beveled cylindrical hole forming the receptacle 72 is etched into the exterior side of the same lid 74.

FIG. 7 illustrates an OSA 80 with a V-shaped groove 82 that provides bare fiber receptacle that receives one of the terminal portions 20a of the optical fibers 16 of the optical interconnects of FIGS. 1–3. FIG. 8 illustrates an OSA 90 with a built up structure 92 that provides a ferrule receptacle 94 that receives one of the polished ferrules 52 of the optical interconnect 50 of FIG. 4.

While I have described several embodiments of my parallel fiber-fan-out optical interconnect that can be used in fiber optic systems, and several different embodiments of OSAs for use therewith, modifications and adaptations thereof will occur to those skilled in the art. Therefore, the protection afforded my invention should only be limited in accordance with the scope of the following claims.

I claim:
1. A parallel optical interconnect for use in a fiber optic system, comprising:
   a plurality of first segments of optical fibers extending in a side-by-side arrangement;
   a first holder in the form of a first discrete body member that maintains a plurality of first terminal portions of the first segments in a first predetermined pitch;
   a fiber-fan-out including a plurality of second segments of the optical fibers extending in a diverging arrangement from the plurality of first segments; and
   a second holder in the form of a second discrete body member that maintains a plurality of second terminal portions of the second segments in a second predetermined pitch that is greater than the first predetermined pitch.

2. A fiber optic system, comprising:
   a plurality of first segments of optical fibers extending in a side-by-side arrangement;
   a first holder that maintains a plurality of first terminal portions of the first segments in a first predetermined pitch so that the first terminal portions can each be optically coupled to a corresponding routed optical fiber via a parallel optical connector having the first predetermined pitch;
   a fiber-fan-out including a plurality of second segments of the optical fibers extending in a diverging arrangement from the plurality of first segments;
   a second holder that maintains a plurality of second terminal portions of the second segments in a second predetermined pitch that is greater than the first predetermined pitch;
   a plurality of optical subassemblies (OSAs) arranged in an array, each OSA being optically coupled to a corresponding one of the second terminal portions of the second segments; and
   the first and second holders being provided by a common housing assembly surrounding the first and second segments of the optical fibers except for the first and second terminal portions.

3. A fiber optic system, comprising:
   a plurality of first segments of optical fibers extending in a side-by-side arrangement;
   a first holder that maintains a plurality of first terminal portions of the first segments in a first predetermined pitch so that the first terminal portions can each be optically coupled to a corresponding routed optical fiber via a parallel optical connector having the first predetermined pitch;
   a fiber-fan-out including a plurality of second segments of the optical fibers extending in a diverging arrangement from the plurality of first segments;
   a second holder that maintains a plurality of second terminal portions of the second segments in a second predetermined pitch that is greater than the first predetermined pitch;
   the first and second holders being provided by a common housing assembly surrounding the first and second segments of the optical fibers except for the first and second terminal portions;
   a plurality of alignment pins that extend from at least one end of the housing assembly; and
   a plurality of optical subassemblies (OSAs) arranged in an array, each OSA being optically coupled to a corresponding one of the second terminal portions of the second segments.

4. A fiber optic system, comprising:

a plurality of first segments of optical fibers extending in a side-by-side arrangement;

a first holder that maintains a plurality of first terminal portions of the first segments in a first predetermined pitch so that the first terminal portions can each be optically coupled to a corresponding routed optical fiber via a parallel optical connector having the first predetermined pitch;

a fiber-fan-out including a plurality of second segments of the optical fibers extending in a diverging arrangement from the plurality of first segments;

a second holder that maintains a plurality of second terminal portions of the second segments in a second predetermined pitch that is greater than the first predetermined pitch;

the first and second holders being provided by a common housing assembly surrounding the first and second segments of the optical fibers except for the first and second terminal portions;

a plurality of alignment pins that extend from at least one end of the housing assembly; and a plurality of ferrules, each secured around a corresponding one of the second terminal portions of the second segments.

* * * * *